US006736177B2

United States Patent
Ueyoko

(10) Patent No.: US 6,736,177 B2
(45) Date of Patent: May 18, 2004

(54) PNEUMATIC TIRE

(75) Inventor: Kiyoshi Ueyoko, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/873,238

(22) Filed: Jun. 5, 2001

(65) Prior Publication Data
US 2002/0033219 A1 Mar. 21, 2002

(30) Foreign Application Priority Data
Jun. 5, 2000 (JP) ........................................ 2000-168040

(51) Int. Cl.⁷ ..................... B60C 15/00; B60C 15/06
(52) U.S. Cl. ................. 152/539; 152/541; 152/543; 152/547; 152/552; 152/555
(58) Field of Search ................. 152/539, 540, 152/551, 552, 554; 245/1.5

(56) References Cited

U.S. PATENT DOCUMENTS

| 4,387,759 A | * | 6/1983 | Obata | ........................ 152/525 |
| 6,135,182 A | * | 10/2000 | Nagai | ........................ 152/458 |

FOREIGN PATENT DOCUMENTS

| EP | 0 492 504 A1 | 7/1992 |
| EP | 0 934 837 A2 | 8/1999 |
| GB | 1000113 | 8/1965 |
| GB | 2064442 | * 6/1981 |
| GB | 2336344 | * 10/1999 |
| JP | 64-30808 | * 2/1989 |
| JP | 5-24418 | * 2/1993 |
| JP | 8-40026 | * 2/1996 |
| JP | 11-321244 | * 11/1999 |
| JP | (A) 2000-85322 | 3/2000 |

OTHER PUBLICATIONS

Machine translation of JP 08–040026.*

* cited by examiner

*Primary Examiner*—Jeff H. Aftergut
*Assistant Examiner*—Justin Fischer
(74) *Attorney, Agent, or Firm*—Birch, Stewart, Kolasch & Birch, LLP

(57) ABSTRACT

A pneumatic tire comprises a carcass comprising one ply of cords extending between the bead portions through the tread portion and sidewall portions and turned back in each said bead portion from the axially inside to the axially outside of the tire and wound around the bead core so as to form a pair of wound portions and a main portion therebetween, wherein a radially outer part of the wound portion, which is defined as extending axially inwards along the radially outer face of the bead core, has a certain length when measured along the radially outer face which is not less than 0.5 times the width of the radially outer face, and an organic fiber cord layer is disposed between the radially outer part and the radially outer face of the bead core, and a distance between the cords of the radially outer part and the radially outer face of the bead core in a normal direction to the radially outer face is in a range of from 0.05 to 1.0 times the section height of the bead core.

7 Claims, 5 Drawing Sheets

PNEUMATIC TIRE

The present invention relates to a pneumatic tire, more particularly to an improved bead structure being capable of improving durability of the bead portion.

In general, a pneumatic tire is provided with a carcass comprising one ply of cords turned up around a bead core in each bead portion from the axially inside to the axially outside of the tire. The turned up portion (d) is, as shown in FIG. 6A, extended radially outwards beyond the radially outer end of the bead core (b) and terminates in the lower sidewall portion. In such a structure, at the carcass ply edge or the radially outer end (de) of the turned up portion (d), a stress concentration is liable to occur during running because the deformation of the lower sidewall portion is relatively large. If the deformation is extremely large, a separation failure starting from the carcass ply edge (de) tends to be caused.

In the laid-open Japanese patent application JP-A-11-321244, in order to avoid such stress concentration on the carcass ply edge (de), the carcass ply edge portion (d) is wound once around the bead core (b) to terminate in the bead portion, abutting on the radially outer surface (ba) of the bead core (b), as shown in FIG. 6B.

Such construction, however, tends to become insufficient for securing the carcass ply edge to the bead core under extremely severe service conditions, for example, high speed running under a heavy load and high inner pressure. And there is a possibility that the carcass ply slips from the bead core.

It is therefore, an object of the present invention to provide a pneumatic tire in which, even under extremely severe service conditions, the carcass ply edge is secured safely to the bead cores to improve the durability of the bead portion.

According to the present invention, a pneumatic tire comprises a pair of bead portions each with a bead core therein, a carcass comprising one ply of cords extending between the bead portions through a tread portion and sidewall portions and turned back in each bead portion from the axially inside to the axially outside of the tire and wound around the bead core in each bead portion so as to form a pair of wound portions and a main portion therebetween, each wound portion having a radially outer part extending axially inwards along the radially outer face of the bead core to have a length not less than 0.5 times the width of said radially outer face when measured along the radially outer face, each bead portion provided between the radially outer part and the radially outer face of the bead core with an organic fiber cord layer, a distance between the carcass cords in the radially outer part and the radially outer face of the bead core being in a range of from 0.05 to 1.0 times the section height of the bead core when measured in a normal direction to the radially outer face of the bead core.

Embodiments of the present invention will now be described in detail in conjunction with the accompanying drawings.

Figure 1:
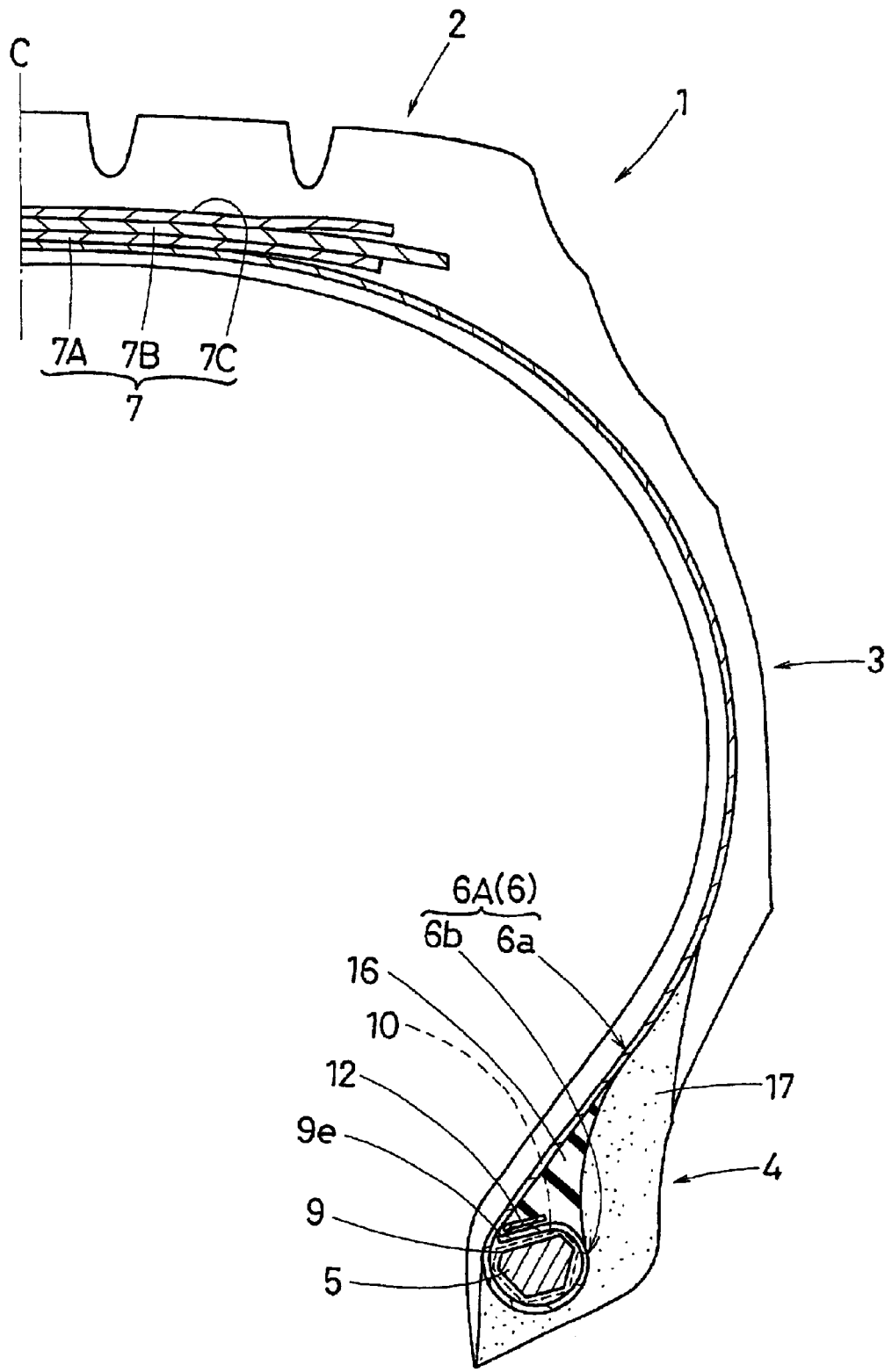
FIG. 1 is a cross sectional view of a pneumatic tire according to the invention.

In the drawings, pneumatic tire 1 according to the present invention comprises a tread portion 2, a pair of bead portions 4 each with a bead core 5 therein, a pair of sidewall portions 3, a carcass 6 extending between the bead portions 4 through the tread portion 2 and sidewall portions 3, and a belt 7 disposed radially outside the carcass 6 in the tread portion 2.

The pneumatic tire in this embodiment is a heavy duty radial tire for trucks and buses, and the tire is mounted on a 15-degree-taper center drop rim of which bead seat is tapered at an inclination angle of 15 degrees.

The belt comprises a breaker 7 and optionally a band.

The breaker 7 comprises a plurality of plies of parallel cords laid at a certain angle with respect to the tire equator. Usually, the breaker 7 comprises three or four plies including two cross plies. For the breaker cords, high elastic modulus cords such as steel, aramid and the like may be used.

In this example, the breaker is composed of three plies disposed one upon another, wherein the radially innermost ply 7A is made of parallel cords laid at an angle of from 50 to 70 degrees with respect to the tire equator C. The radially outer two plies 7B and 7C which are cross plies are each made of steel cords laid at a small angle of not more than 30 degrees with respect to the tire equator C.

Figure 2:
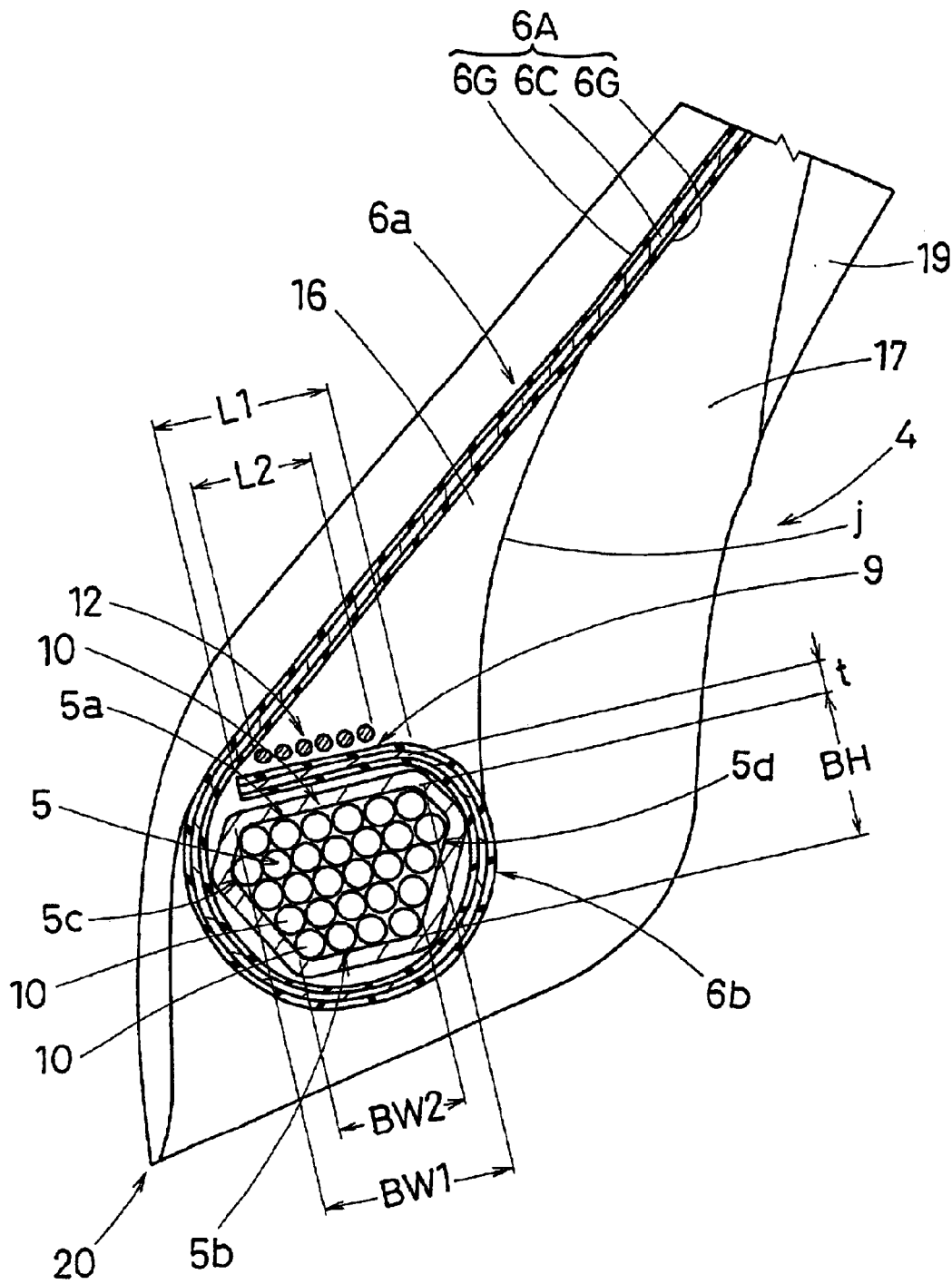
FIG. 2 is an enlarged view of the bead portion thereof.

The bead core 5 in this example is formed by coiling a bead wire 10 into a specific cross sectional shape as shown in FIG. 2. Here, the bead wire 10 is a high elastic modulus wire which may be a single metallic wire such as piano wire, a cord of twisted metallic wires, a high-modulus organic monofilament, a cord of twisted high-modulus organic filaments, etc. For the material therefor, steel, aromatic polyamide and the like may be used.

As to the cross sectional shape of the bead core 5, a radially outer face 5a and a radially inner face 5b are substantially parallel with the bottom of the bead portion so that, when the tire is mounted on the wheel rim, these faces 5a and 5b becomes substantially parallel with the bead seat of the wheel rim. Thus, the radially outer face 5a and radially inner face 5b are inclined at an angle in a range of 15 degrees plus/minus 2 degrees with respect to the tire axial direction. An axially inner face 5c and axially outer face 5d extending between the radially outer face 5a and radially inner face 5b are bent in a V-shape so that the cross sectional shape is an irregular hexagon. In order to realize this cross sectional shape, the number of turns of the bead wire is changed from the radially inner face 5b to the radially outer face 5a. In the example shown in FIG. 2, the number of turns is 4-5-6-7-6.

In the cross section of the bead core 5, the radially outer face 5a is defined as a tangential line to the radially outermost windings of the bead wire 10, and it is preferable that the radially outer face 5a is substantially straight and the width BW1 of the radially outer face 5a is set in a range of 10 to 28 mm, more preferably 13 to 24 mm. Preferably, the width BW1 is more than the width BW2 of the radially inner face 5b. The ratio BW2/BW1 of the width BW2 to the width BW1 is set in a range of less than 1.0 times, more preferably from 0.5 to 0.9.

Aside from the coiled single bead wire, the bead core 5 may be a solid annular body having the specific sectional shape.

The above-mentioned carcass 6 comprises at least one ply of cords 6C rubberized with a topping rubber compound 6G.

In this example, the carcass is composed of a single ply 6A. For the carcass cords 6C, organic fiber cords, e.g. nylon, rayon, polyester, aromatic polyamide and the like or steel cords may be used. In case of heavy duty radial tire subjected to a very high inner pressure and heavy tire loads, high modulus cords such as aromatic polyamide cords or steel cords are preferably used. In this example, therefore, aromatic polyamide fiber cords are used. The carcass cords 6C in each carcass ply are arranged radially at an angle in a range of from 70 to 90 degrees with respect to the tire equator C so that the tire has a radial or semi-radial carcass structure.

The carcass ply 6A extends between the bead portions 4 and is turned back in each bead portion 4 from the axially inside to outside of the tire and wound substantially once around the bead core thereby forming a pair of a wound portions 6b and a toroidal main portion 6a therebetween. The toroidal main portion 6a extends from the bead core 5 in one of bead portions 4 to the bead core 5 in the other bead portion 4 through the tread portion 2 and sidewall portions 3.

The wound portion 6a has a radially outer part 9 which extends axially inwards along the radially outer face 5a of the bead core 5 and terminates near the axially inner end of the radially outer face 5a.

The radially outer part 9 adjoins the radially outer face 5a of the bead core 5 and has a length L1 of not less than 0.5 times, preferably not less than 0.7 times, more preferably not less than 0.8 times the width BW1 of the radially outer face 5a. If the length L1 is less than 0.5 times the width BW1, the effect of preventing the carcass ply 6A from slipping from the bead core decreases, and it becomes difficult to improve the durability of the bead portion 4.

Each bead portion 4 is provided between radially outer part 9 and the bead core 5 with an organic fiber cord layer 10 in order to provide a certain distance (t) between the carcass cords 6C in the radially outer part 9 and the radially outer face 5a of the bead core 5. When measured normally to the radially outer face 5a, the distance (t) is in a range of from 0.05 to 1.0 times, preferably 0.08 to 0.8 times the section height BH of the bead core 5. Usually, the distance (t) is set in a range of from 0.1 to 5.0 mm, preferably 0.3 to 4.0 mm. Here, the section height BH of the bead core is defined as the maximum height in a direction at a right angle to the radially outer face 5a.

If the distance (t) is less than 0.05 times the section height BH, the adhesive force between the radially outer part 9 and the radially outer face 5a of the bead core 5 tends to become insufficient for controlling the initial separation therebetween which may cause the carcass ply to slip from the bead core if it growths. If the distance (t) is too large, there is a tendency for the cords of the radially outer part 9 to separate from the rubber during repeated deformation of the bead portion 4.

The organic fiber cord layer 10 can mitigate a large difference in rigidity between the radially outer part 9 and the bead core 5, and therefore, a separation failure due to a large rigidity difference can be effectively prevented.

The organic fiber cord layer 10 must be provided between the radially outer part 9 and the radially outer face 5a at least. That is, the organic fiber cord layer 10 extends along at least the radially outer part 9. In this example, as the organic fiber cord layer 10 is formed by winding a strip of rubberized parallel organic fiber cords 10C around the bead core 5 about one turn, the organic fiber cord layer 10 extends around the bead core 5.

The organic fiber cords 10C are inclined at an angle of from 10 to 80 degrees, preferably 20 to 60 degrees with respect to the tire circumferential direction. If the angle is less than 10 degrees, the winding is difficult. If the angle is more than 80 degrees, it becomes difficult to keep the distance (t) stably.

As to the material of the organic fiber cords 10C, nylon, rayon, polyester, aromatic polyamide and the like can be used. Preferably, nylon, especially nylon-6 having a low elastic modulus and being superior in the adhesion to rubber is used.

The diameter D of the organic fiber cord 10C is set in a range of from 0.1 to 5.2 times, preferably 0.13 to 1.7 times the distance (t).

Figure 3:
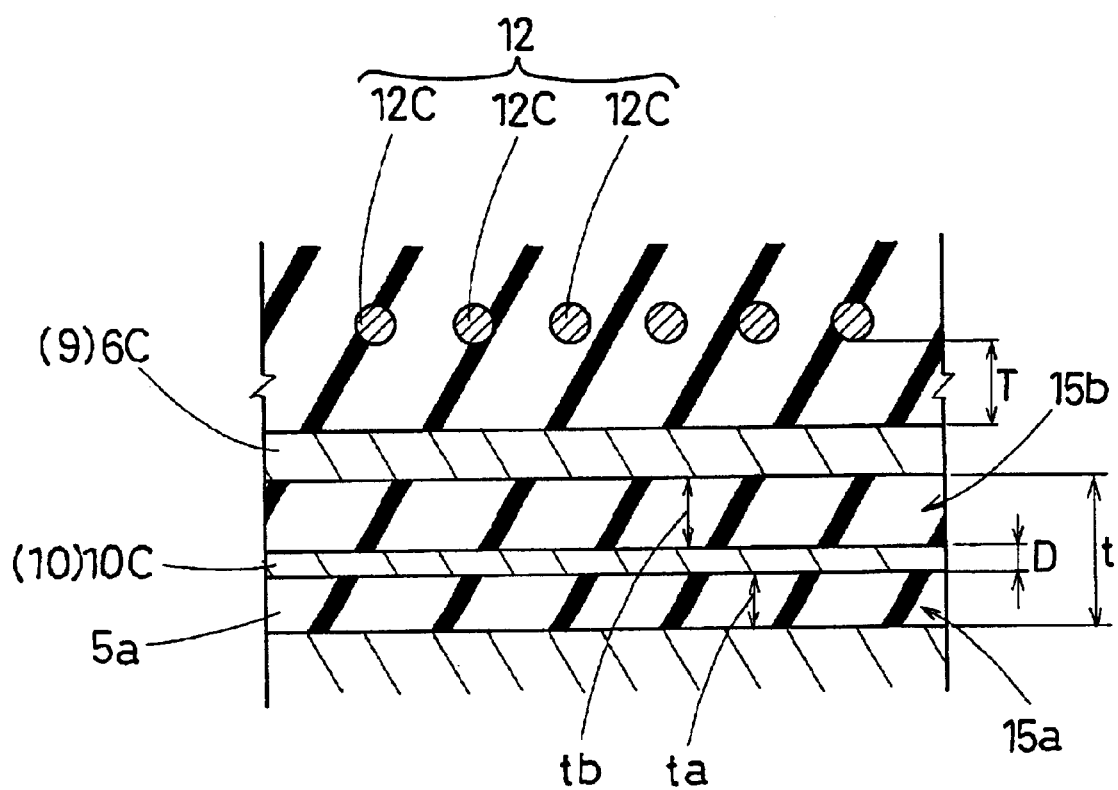
FIG. 3 is a schematic enlarged cross sectional view.

As shown in FIG. 3, a rubber layer 15a whose thickness (ta) is in a range of from 0.1 to 0.6 mm, preferably 0.2 to 0.4 mm, is formed between the organic fiber cords 10C and the bead core 5. A rubber layer 15b whose thickness (tb) is in a range of from 0.1 to 0.6 mm, preferably 0.2 to 0.4 mm, is formed between the organic fiber cords 10C and the carcass cords 6C.

If the thickness (ta, tb) is less than 0.1 mm, the organic fiber cords 10C and the carcass cords 6C tend to directly contact with each other. If the thickness (ta,tb) is more than 0.6 mm, working properties in winding around the bead core 5 tend to decrease.

Further, a reinforcing layer 12 made of reinforcing cords 12C is disposed radially outside the radially outer part 9 in order to secure the radially outer part 9 between the reinforcing layer 12 and the bead core 5 to prevent the carcass ply 6A from slipping.

The reinforcing layer 12 is formed by spirally winding, on the radially outside of the radially outer part 9, a single cord 12C or a plurality of cords 12C which are embedded in a topping rubber compound in a form of tape.

Figure 5:
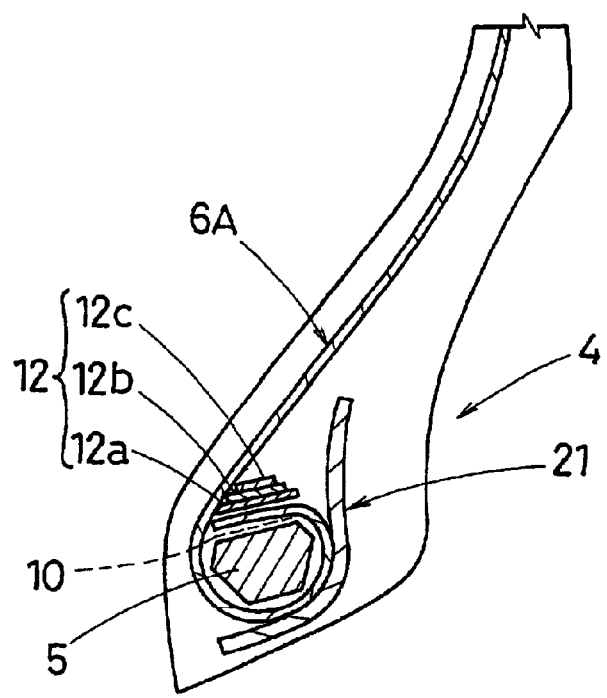
FIG. 5 is a cross sectional view of another embodiment of the present invention.

The reinforcing layer 12 in FIG. 2 has a single layered structure, and in the cross section, the layer 12 is substantially parallel with the radially outer part 9. But, the reinforcing layer 12 may be a plural-layered structure as shown in FIG. 5 (radially inner, middle and outer layers 12a, 12b and 12c).

For the cords 12C of the reinforcing layer 12, organic fiber cords, e.g. nylon, rayon, aromatic polyamide and the like and steel cord may be used. Preferably, heat-shrinkable materials including nylon are used because the radially outer part 9 is tightened by the heat shrinkage of the reinforcing layer 12 during vulcanization and the effect to prevent the slipping of the carcass ply 6A from the bead core can be further improved.

The length L2 of a portion of the reinforcing layer 12 which portion is parallel with the radially outer face 5a of the bead core 5 is set in a range of from 0.7 to 1.3 times, preferably 0.8 to 1.1 times the length L1 of the radially outer part 9. If L2/L1 is less than 0.7, the tightening effect decreases. If L2/L1 is increased above 1.3, although the tightening effect does not increase any more, the tire weight increases.

The inclination angle of the cords 12C of the reinforcing layer 12 with respect to the circumferential direction is set in a range of from 0 to 45 degrees, preferably 0 to 15 degrees, more preferably 0 to 5 degrees. By arranging the cords 12C in substantially parallel with the circumferential direction, the tightening effect can be further improved.

Preferably, the distance (T) between the cords 12C of the reinforcing layer 12 and the carcass cords 6C in the radially outer part 9 is set in a range of from 0.01 to 0.3 times, more preferably 0.05 to 0.2 times the section height BH of the bead core 5. If the distance (T) is less than 0.01 times the section height BH, the adhesive force therebetween tends to become insufficient. If the distance (T) is more than 0.3 times the section height BH, the tightening effect tends to become insufficient.

Each bead portion 4 is provided with a bead apex rubber 16 radially outside the radially outer part 9, in this example, disposed on the radially outside of the reinforcing layer 12. The bead apex rubber 16 tapers towards the radially outer end thereof. The bead apex rubber 16 has a 100% modulus of from 6.3 to 8.6 MPa, preferably 6.8 to 8.2 MPa. If the 100% modulus is less than 6.3 MPa, the bending rigidity of the bead portion 4 becomes insufficient. If the 100% modulus of the bead apex rubber 16 is more than 8.6 MPa, the rigidity of the bead portion 4 becomes excessively increased, and the heat generation increases.

Further, each of the bead portions 4 is provided with a chafer rubber 17. The chafer rubber 17 is disposed along the axially outer surface and bottom surface of the bead portion, defining the face contacting with the wheel rim. The chafer rubber 17 is disposed on the axially outside of the bead apex rubber 16 and extends radially outwardly to a sidewall rubber 19 to be spliced thereto. The sidewall rubber 19 is disposed on the axially outside of the carcass in the sidewall portion 3. The chafer rubber 17 further extends radially inwardly towards the bead toe 20. As the chafer rubber 17 forms the outer surface of the bead portion 4 which comes into contact with the wheel rim, a rubber material having a high wear resistance such as NR, BR, etc. is preferably used. The chafer rubber 17 has a 100% modulus which is less than the 100% modulus of the bead apex rubber and in a range of from 5.4 to 8.2 MPa, preferably 5.6 to 8.0 MPa.

If the 100% modulus of the chafer rubber 17 is less than 5.4 MPa, the rigidity of the bead portion 4 decreases, and wear and damage are liable to occur in the part contacting with the wheel rim. If the 100% modulus is more than 8.2 MPa, the heat generation increases and the durability decreases. If the 100% modulus of the chafer rubber 17 is more than that of the bead apex rubber 16, a separation failure is liable to occur along the boundary j between the bead apex rubber 16 and chafer rubber 17.

Preferably, the difference in the 100% modulus between the bead apex rubber 16 and the chafer rubber 17 is set in a range of from 0.5 to 2.0 MPa, whereby the effect to prevent the separation is enhanced and the durability may be improved.

For the bead apex rubber 16 and chafer rubber 17, a high-strength high-rigidity material such as a mixture of rubber and resin may be used.

Figure 4:
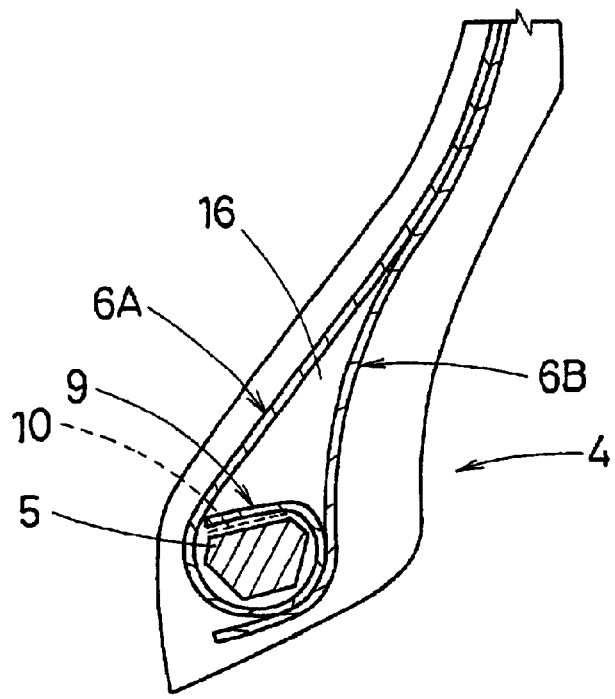
FIG. 4 is a cross sectional view of another embodiment of the present invention.

FIG. 4 shows a modification of the carcass 6. In this example, a carcass ply 6B is further provided outside the carcass ply 6A. This carcass ply 6B extends continuously between the bead portions 4 and further extends towards the axially inside of the tire, passing through the axially outside of the bead core 5, and terminates on the radially inside of the bead core 5. In this figure, the reinforcing layer 12 is omitted.

FIG. 5 shows a further modification of the bead structure shown in FIG. 2. In this example, a bead reinforcing layer 21 of rubberized cords is further disposed. The bead reinforcing layer 21 extends from a position above the reinforcing layer 12 to the vicinity of the bead toe similarly to the outer carcass ply 6B in FIG. 4.

Comparison Tests

Heavy duty radial tires (size 225/80R17.5 14PR) were experimentally made and tested for the bead durability.

In the bead durability test, the test tire mounted on a 6.00×17.5 wheel rim and inflated to 700 kPa was run at a speed of 20 km/hr under a tire load of 41 kN and until the tire was broken, and the runable distance was measured.

The results are indicate in Table 1 by an index based on Prior art tire being 100, wherein the larger the value, the better the durability.

The carcass, belt and bead core were as follows.

In Ex.1 tire, Ref.1 tire and Ref.2 tire, Conventional tire and prior art tire, the carcass was composed of a single ply of steel cords (3×0.2+7×0.23) arranged at 90 degrees with respect to the tire equator at a cord count of 38/5 cm beneath the bead core, the belt was a breaker composed of three plies of steel cords (3×0.2+6×0.35) laid at angles of +67, +18, −18 degrees (from the radially inner ply to outer ply) with respect to the tire equator at a cord count of 26/5 cm, and the bead core was composed of a 1.55 mm dia. steel wire (piano wire) wound in a five-layered structure (4×5×6×7×6).

In Ex.2 tire, the carcass was composed of a single ply of aromatic polyamide cords arranged at 90 degrees with respect to the tire equator at a cord count of 40/5 cm beneath the bead core, the belt was the same as above, and the bead core was the same as above.

From the test results, it was confirmed that in comparison with the prior art tire, Example tires according to the present invention were improved in the durability of the bead portion.

The present invention is suitably applied to pneumatic tires for light trucks, heavy duty vehicles and the like, but it is also possible to apply to passenger car tires, and the like.

TABLE 1

Figure 6A:
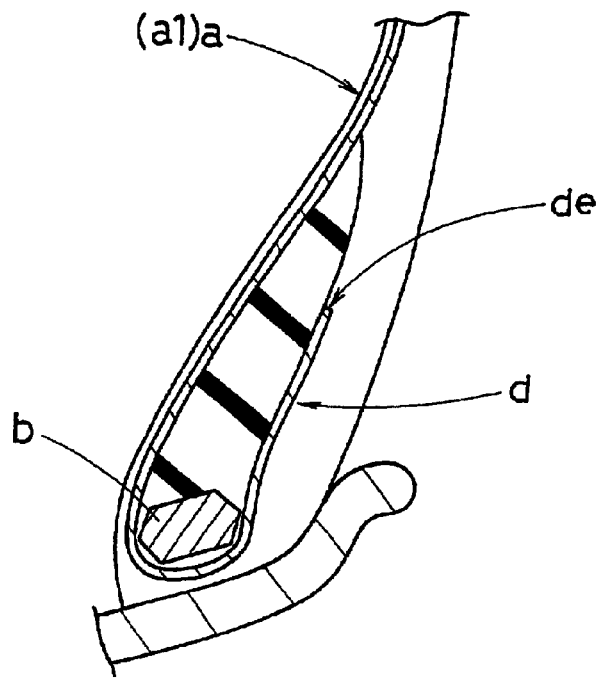
FIG. 6A is a cross sectional view showing a conventional bead structure.
Figure 6B:
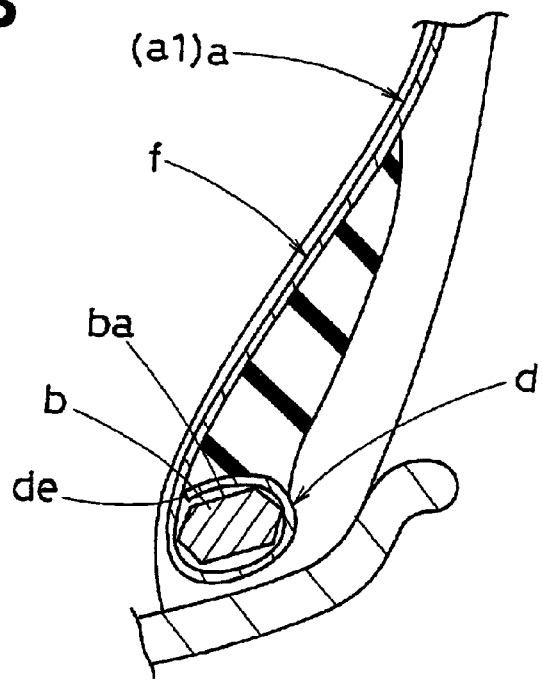
FIG. 6B is a cross sectional view showing the prior art.

| Tire | Ref. 1 | Ref. 2 | Ex. 1 | Ex. 2 | Ex. 3 | Ex. 4 | Ex. 5 | Prior art | Conventional |
|---|---|---|---|---|---|---|---|---|---|
| Bead structure | FIG. 1 | FIG. 1 | FIG. 1 | FIG. 1 | FIG. 1 | FIG. 1 | FIG. 1 | FIG. 6B | FIG. 6A |
| L1/BW1 | 0.8 | 0.8 | 0.8 | 0.8 | 0.8 | 0.8 | 0.8 | 0.8 | — |
| t1/BH | 0.4 | 1.1 | 0.2 | 0.4 | 0.4 | 0.4 | 0.4 | 0.2 | — |
| Organic fiber cord layer | none | | | | | | | none | none |
| Cord material | rubber only | nylon6 940dtex/2 | nylon6 940dtex/2 | nylon6 940dtex/2 | nylon6 940dtex/2 | nylon6 940dtex/2 | nylon6 940dtex/2 | rubber only | rubber only |
| Cord count (/5 cm) | — | 26 | 26 | 26 | 26 | 26 | 26 | | |
| Reinforcing layer | none | none | none | | | | | none | none |
| Cord material | | | | aramid 1670dtex/1/2 | aramid 1670dtex/1/2 | aramid 1670dtex/1/2 | aramid 1670dtex/1/2 | | |
| Cord direction *1 | | | | circum. | circum. | circum. | circum. | | |
| 100% modulus (MPa) | | | | | | | | | |
| Bead apex rubber | 7.2 | 7.2 | 1.3 | 7.2 | 7.2 | 7.2 | 7.2 | 7 | 7 |
| Chafer rubber | 6.3 | 6.3 | 6.3 | 7.2 | 8.5 | 6.3 | 6.3 | 7 | 7 |
| Bead durability | 102 | 98 | 105 | 120 | 105 | 200 | 200 | 100 | 70 |

*1 circum. = parallel to the tire circumferential direction
BH = 7.0 mm, BW1 = 10.0 mm

What is claimed is:

1. A pneumatic tire comprising
a pair of bead portions each with a bead core therein,
a carcass comprising one ply of cords extending between the bead portions through a tread portion and sidewall portions and turned back in each said bead portion from the axially inside to the axially outside of the tire and wound around the bead core in each said bead portion so as to form a pair of wound portions and a main portion therebetween,
each said wound portion having a radially outer part extending axially inwards along the radially outer face of the bead core to have a length not less than 0.5 times the width of said radially outer face when measured along the radially outer face,
each said bead portion provided between said radially outer part and the radially outer face of the bead core with an organic fiber cord layer,
a distance between the carcass cords in said radially outer part and the radially outer face of the bead core being in a range of to not more than 1.0 times the section height of the bead core when measured in a normal direction to the radially outer face of the bead core, wherein
in each said bead portion,
a reinforcing layer of cords is disposed radially outside the radially outer part so as to secure the radially outer part between the reinforcing layer and the bead core,
a bead apex rubber is disposed radially outside the reinforcing layer, and
a chafer rubber is disposed axially outside the bead apex rubber along an axially outer surface and bottom surface of the bead portion, and
the bead apex rubber has a 100% modulus in a range of from 6.3 to 8.6 MPa, the chafer rubber has a 100% modulus in a range of from 5.4 to 8.2 MPa, and the 100% modulus f the chafer rubber is less than the 100% modulus of the bead apex.

2. The pneumatic tire according to claim 1, wherein the cords of the reinforcing layer are laid at an angle in a range of from 0 to 45 degrees with respect to the circumferential direction of the tire.

3. The pneumatic tire according to claim 1, wherein the cords of the reinforcing layer are laid at an angle in a range of from 0 to 5 degrees with respect to the circumferential direction.

4. A pneumatic tire comprising
a pair of bead portions each with a bead core therein,
a carcass comprising one ply of cords extending between the bead portions through a tread portion and sidewall portions and turned back in each said bead portion from the axially inside to the axially outside of the tire and wound around the bead core in each said bead portion so as to form a pair of wound portions and a main portion therebetween,
each of the wound portions having a radially outer part extending axially inwards along the radially outer face of the bead core to have a length not less than 0.5 times the width of said radially outer face when measured along the radially outer face,
each said bead portion provided between said radially outer part and the radially outer face of the bead core with an organic fiber cord layer, in such bead portion, a reinforcing layer of cords disposed radially outside said radially outer part to secure the radially outer part between the reinforcing layer and the bead core,
an organic fiber cord layer of organic fiber cords disposed between said radially outer part and the radially outer face of the bead core,
an inner rubber layer between the organic fiber cords of said organic fiber cord layer and the bead core 5, having a thickness (ta) of from 0.1 to 0.6 mm,
an outer rubber layer between the organic fiber cords of said organic fiber cord layer and the carcass cords in said radially outer part, having a thickness (tb) of from 0.1 to 0.6 mm,
a bead apex rubber disposed on the radially outside of said reinforcing layer,
a chafer rubber is disposed axially outside the bead apex rubber along an axially outer surface and bottom surface of the bead portion, and
the bead apex rubber has a 100% modulus in a range of from 6.3 to 8.6 MPa, the chafer rubber has a 100% modulus in a range of from 5.4 to 8.2 MPa, and the 100% modulus of the chafer rubber is less than the 100% modulus of the bead apex, and
a distance between the carcass cords in said radially outer part and the radially outer face of the bead core being in a range of not more than 1.0 times the section height of the bead core when measured in a normal direction to the radially outer face of the bead core.

5. The pneumatic tire according to claim 4, wherein the cords of said reinforcing layer are laid at an angle in a range of from 0 to 5 degrees with respect to the circumferential direction.

6. The pneumatic tire according to claim 4, wherein the cords of said reinforcing layer are laid at an angle in a range of from 0 to 45 degrees with respect to the circumferential direction of the tire.

7. A pneumatic tire comprising
a pair of bead portions each with a bead core therein,
a carcass comprising one ply of cords extending between the bead portions through a tread portion and sidewall portions and turned back in each said bead portion from the axially inside to the axially outside of the tire and wound around the bead core in each said bead portion so as to form a pair of wound portions and a main portion therebetween,
each of the wound portions having a radially outer part extending axially inwards along the radially outer face of the bead core to have a length not less than 0.5 times the width of said radially outer face when measured along the radially outer face,
a bead apex rubber disposed on the radially outside of said radially outer part,
an organic fiber cord layer of organic fiber cords disposed between said radially outer part and the radially outer face of the bead core,
each said bead portion provided between said radially outer part and the radially outer face of the bead core with an organic fiber cord layer, in each bead portion a reinforcing layer of cords is disposed radially outside the radially outer part so as to secure the radially outer part between the reinforcing layer and the bead core,
an inner rubber layer between the organic fiber cords of said organic fiber cord layer and the bead core 5, having a thickness (ta) of from 0.1 to 0.6 mm, an outer rubber layer between the organic fiber cords of said organic fiber cord layer and the carcass cords in said radially outer part, having a thickness (tb) of from 0.1 to 0.6 mm, a distance between the carcass cords in said radially outer part and the radially outer face of the bead core being in a range of not more than 1.0 times the section height of the bead core when measured in a normal direction to the radially outer face of the bead core, a chafer rubber disposed axially outside the bead apex rubber along an axially outer surface and bottom surface of the bead portion, said chafer rubber having a 100% modulus of from 5.4 to 8.2 MPa, and said bead apex rubber having a 100% modulus of from 6.3 to 8.6 MPa which is more than the 100% modulus of the chafer rubber.

* * * * *